(12) United States Patent
Fisher et al.

(10) Patent No.: US 6,229,236 B1
(45) Date of Patent: May 8, 2001

(54) MOUNTING BRACKET FOR MOTOR CAPACITOR

(76) Inventors: Lynn Edwin Fisher, 1616 Hollister Ter., Fort Wayne, IN (US) 46825; Wes W. Gerber, 3106 S. 600W-1, Bluffton, IN (US) 46714

( * ) Notice: Subject to any disclaimer, the term of this patent is extended or adjusted under 35 U.S.C. 154(b) by 0 days.

(21) Appl. No.: 09/345,050

(22) Filed: Jun. 30, 1999

(51) Int. Cl.[7] .................................................. H02K 5/00
(52) U.S. Cl. ........................ 310/89; 310/91; 248/231.81
(58) Field of Search .................... 310/89, 68 R, 310/66, 91; 248/316.7, 310, 231.87

(56) References Cited

U.S. PATENT DOCUMENTS

| | | | |
|---|---|---|---|
| 2,219,495 | * 10/1940 | Sleeter et al. | 310/72 |
| 2,253,405 | * 8/1941 | Veinott | 310/166 |
| 2,460,903 | * 2/1949 | Peck | 361/516 |
| 2,683,824 | * 7/1954 | Carville et al. | 310/72 |
| 2,811,657 | * 10/1957 | Mollenberg | 310/72 |
| 3,047,648 | * 7/1962 | Mowatt | 174/16.1 |
| 3,210,457 | * 10/1965 | Hancock et al. | 174/48 |
| 3,395,298 | * 7/1968 | Shifley | 310/72 |
| 3,490,820 | * 1/1970 | Lewis | 310/72 |
| 4,326,237 |   4/1982 | Markarian et al. | 361/329 |
| 4,447,854 |   5/1984 | Markarian | 361/329 |
| 5,493,158 | * 2/1996 | Daniels | 310/68 R |
| 5,548,169 |   8/1996 | Iwasa et al. | 310/72 |
| 5,555,485 |   9/1996 | Wallace | 361/272 |
| 5,684,347 | * 11/1997 | Vogt et al. | 310/68 C |
| 5,694,301 |   12/1997 | Donegan et al. | 361/830 |
| 5,872,410 | * 2/1999 | Sudoff | 310/68 R |

* cited by examiner

*Primary Examiner*—Joseph Waks
(74) *Attorney, Agent, or Firm*—Carl B. Horton, Esq.; Damian Wasserbauer, Esq.; Armstrong Teasdale LLP

(57) ABSTRACT

A mounting bracket for a motor run capacitor includes a capacitor clasp which extends from a base to the motor run capacitor. The mounting bracket further includes a U-shaped member which attaches the bracket to a motor shell. The bracket also includes a tab which connects to a tab coupling on the shell. The motor shell includes a slot and a circular opening for engaging the U-shaped member and a circular projection on a lock of the mounting bracket, respectively.

14 Claims, 3 Drawing Sheets

MOUNTING BRACKET FOR MOTOR CAPACITOR

BACKGROUND OF THE INVENTION

This invention relates generally to motors and, more particularly, to a mounting bracket for mounting capacitors to a motor.

Typical applications in which a run capacitor is utilized in connection with a motor include air conditioners, fans, washing machines, and capacitor-start-capacitor-run motors which alter the time phase relationship between magnetic fields generated by run windings. In these applications, the run capacitor typically is mounted to a motor shell. With an air conditioner, however, vibration may cause the run capacitor to detach from the motor. To prevent such detachment, screws or a "strap" are typically utilized to fasten the capacitor to the motor shell. The use of these screws or the "strap" creates location limitations and adds cost to fabrication and assembly of the motor.

BRIEF SUMMARY OF THE INVENTION

In an exemplary embodiment of the invention, a mounting bracket for securing a capacitor to a motor includes a capacitor clasp and a U-shaped member extending from a base.

More particularly, the U-shaped member includes a first foot and a second foot for securing the mounting bracket to the motor. The mounting bracket further includes a tab and a lock, and the motor includes a motor shell including a slot, an opening, and a tab coupling. The slot and the opening extend through the motor shell.

The capacitor is mounted onto the capacitor clasp. The U-shaped member engages the slot, while the first foot and the second foot rest against the motor shell. In addition, the tab engages the tab coupling, while the lock inserts into the opening to further secure the bracket to the motor shell.

The mounting bracket eliminates separate mounting devices. In addition, the mounting bracket decreases assembly time of the motor run capacitor to a motor.

DETAILED DESCRIPTION OF THE INVENTION

Figure 1:
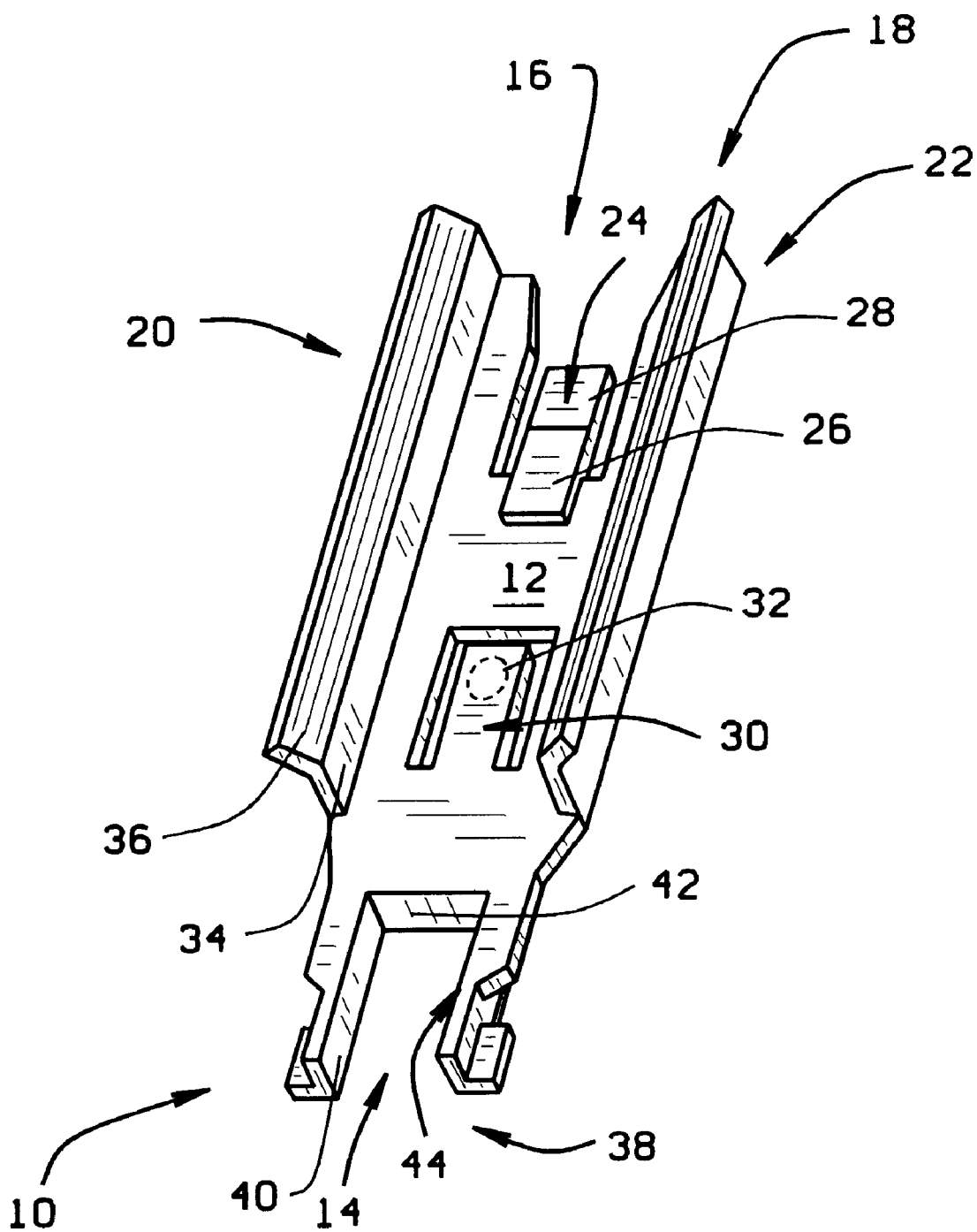
FIG. 1 is a perspective view of a mounting bracket.

FIG. 1 is a perspective view of a mounting bracket 10 including a base 12 having a first end 14 and a second end 16, and a capacitor clasp 18. Capacitor clasp 18 includes a first arm 20 and a second arm 22 which extend from base second end 16 toward base first end 14. Mounting bracket 10 further includes a tab 24 extending between first arm 20 and second arm 22. Tab 24 is tapered and includes a first portion 26 and a second portion 28 which is higher in elevation from base 12 with respect to first portion 26.

A lock 30 also extends between first arm 20 and second arm 22, and includes a circular projection 32 (shown in phantom). First arm 20 and second arm 22 include a first member 34 extending substantially perpendicular from base 12 and a second, curved member 36 extending from first member 34. Bracket 10 further includes a U-shaped member 38 which extends from base first end 14. U-shaped member 38 includes a first portion 40, a second portion 42, and a third portion 44. Second portion 42 connects and is substantially perpendicular to first portion 40 and third portion 44.

Figure 2:
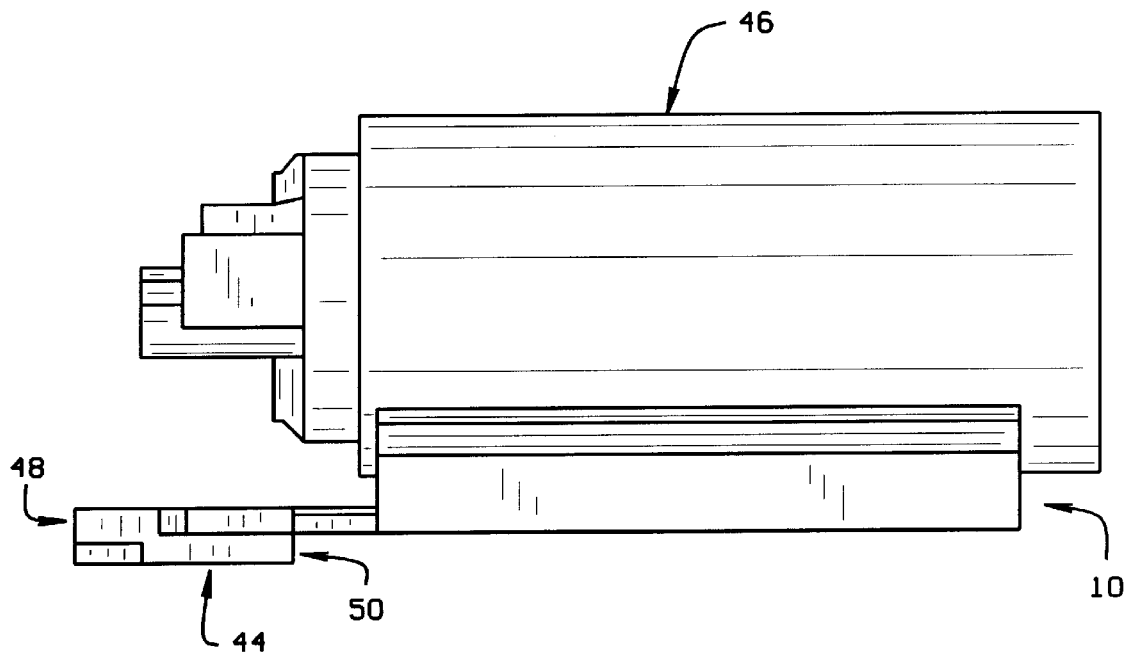
FIG. 2 is a side view of the mounting bracket attached to a motor run capacitor.

FIG. 2 is a side view of mounting bracket 10 attached to a motor run capacitor 46. Third portion 44 includes a forward end 48 and a rear end 50 which connects to second portion 42 (shown in FIG. 1). First portion 40 (shown in FIG. 1) is similar to third portion 44.

Figure 3:
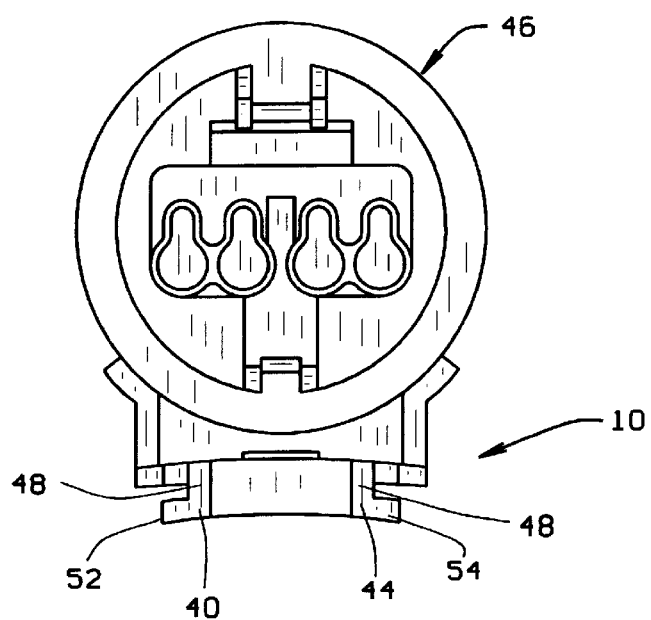
FIG. 3 is an end view of the mounting bracket and the capacitor shown in FIG. 2.

FIG. 3 is an end view of mounting bracket 10 and capacitor 46 shown in FIG. 2. As shown in FIG. 3, first portion 40 and third portion 44 further include a first foot 52 and a second foot 54, respectively. First foot 52 and second foot 54 extend substantially perpendicular from first portion 40 and third portion 44, restively, at forward end 48.

Figure 4:
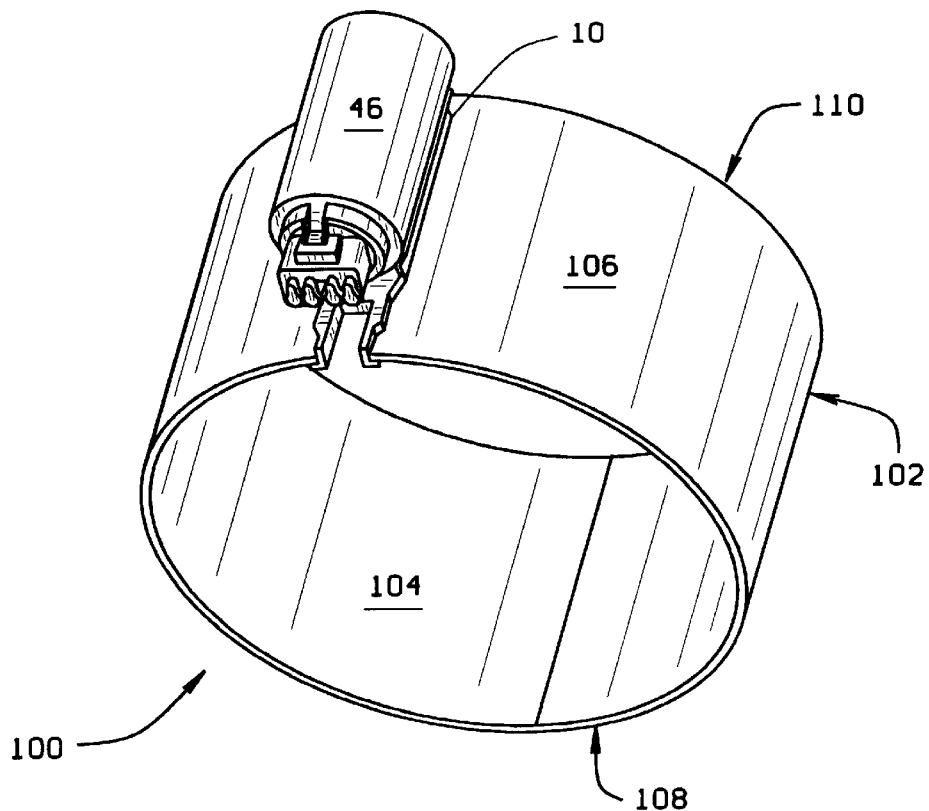
FIG. 4 is a perspective view of a motor assembly including the mounting bracket and the capacitor attached to a motor shell.

FIG. 4 is a perspective view of a motor assembly 100 including capacitor 46 mounted in bracket 10 and attached to a motor shell 102 which includes an inner surface 104 and an outer surface 106. Motor shell 102 is substantially circular and surrounds a portion of a motor (not shown), and includes a first end 108 and a second end 110.

Figure 5:
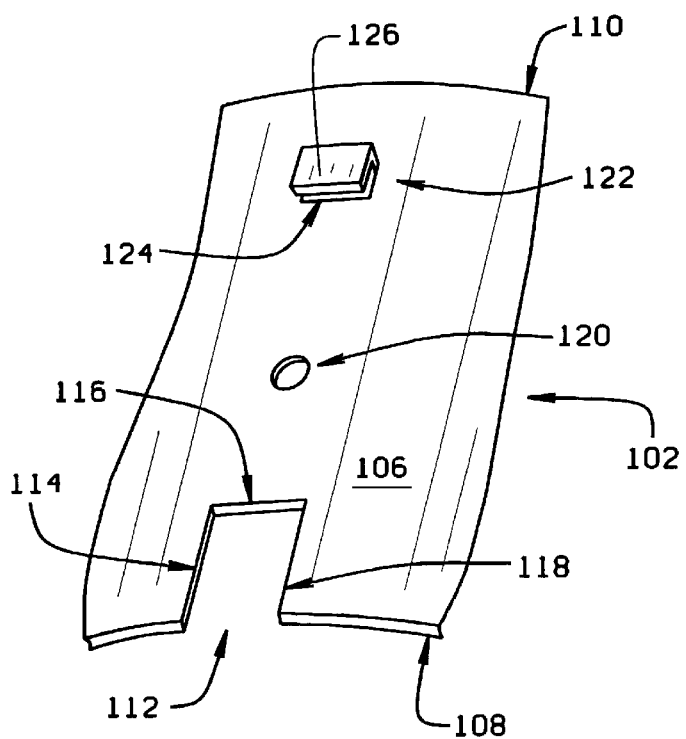
FIG. 5 is a partial view of the motor shell shown in FIG. 4.

FIG. 5 is a partial perspective view of motor shell 102 including a slot 112 extending from first end 108 towards second end 110. Slot 112 includes a first side 114, a second side 116, and a third side 118. Motor shell 102 further includes a first opening 120 located between slot 112 and second end 110. First opening 120 is substantially circular and extends through shell 102. A tab coupling 122 on motor shell 102 is located between first opening 120 and second end 110. Tab coupling 122 includes a second opening 124 which extends through shell 102 and is adjacent a cover 126.

In operation, capacitor 46 is mounted onto mounting bracket 10 by ultrasonically welding, soldering, or bonding capacitor 46 into capacitor clasp 18. More specifically, curved members 36 of first arm 20 and second arm 22 are adjacent and attach to capacitor 46.

Mounting bracket 10 is temporarily secured to motor shell 102 by inserting circular projection 32 of lock 30 into first opening 120 and maintaining base 12 adjacent outer surface 106 during assembly of capacitor 46 and bracket 10 to shell 102. Circular projection 32 and first opening 120 prevent separation of bracket 10 from shell 102 during an initial handling process. However, projection 32 and first opening 120 are not robust enough to hold capacitor 46 and bracket 10 in place during the service life of the motor, and lock 30 may be released from motor shell 102 by prying projection 32 from first opening 120 during the assembly or later field replacement.

Mounting bracket 10 is then secured to motor shell 102 by utilizing first end 14 and second end 16. Mounting bracket first end 14 is attached to motor shell 102 by sliding U-shaped member 38 into slot 112 and utilizing first portion 40, second portion 42, and third portion 44 to attach to first side 114, second side 116, and third side 118, respectively of motor shell 102. The addition of an endshield (not shown) of the motor, against motor shell first end 108, permanently secures and contacts bracket first end 14 to motor shell 102. The addition of the endshield also moves bracket second end 16 closer to motor shell second end 110, and moves tab 24 into tab coupling 122.

Mounting bracket second end 16 is attached to motor shell 102 by insertion of second portion 28 into tab coupling 122, and utilization of cover 126 to secure tab 24 to motor shell 102. Mounting bracket may be fabricated from any material suitable for providing sufficient support for capacitor 46 (shown in FIG. 4), such as tool steel, aluminum, plastic, or any combination thereof. A suitable plastic includes Noryl HS200X, commercially available from General Electric Plastics, Selkirk, N.Y.

Mounting bracket 10 provides a cost effective attachment of capacitor 46 to motor shell 102. Bracket 10 eliminates the need for separate mounting devices for capacitor 46, and decreases the assembly time of capacitor 46 to motor shell 102 and the motor.

While the invention has been described in terms of various specific embodiments, those skilled in the art will recognize that the invention can be practiced with modification within the spirit and scope of the claims.

What is claimed is:

1. A motor assembly comprising:

a motor shell comprising a first opening and a second opening;

a mounting bracket comprising a base, a capacitor clasp, a lock and a tab, said capacitor clasp extending from said base, said tab extending frog said base adjacent said capacitor clasp, said lock extending from said base and separated from said tab along said base by a distance, said tab positioned adjacent said first opening and said lock positioned adjacent said second opening; and a capacitor mounted in said capacitor clasp of said mounting bracket.

2. A motor assembly in accordance with claim 1 wherein said capacitor clasp comprises a plurality of arms, each said arm comprises a first member and a second, curved member, said first member extends from said base, said curved member extends from said first member, said capacitor attached to said curved member.

3. A motor assembly in accordance with claim 1 wherein said motor shell comprises an inner surface, an outer surface, and a tab coupling extending from said shell outer surface, said tab at least partially extends within said tab coupling.

4. A motor assembly in accordance with claim 1 wherein said mounting bracket further comprises a U-shaped member extending from said base, said U-shaped member engaged with said motor shell.

5. A motor assembly in accordance with claim 4 wherein said U-shaped member comprises a first portion, a second portion, and a third portion adjacent said motor shell.

6. A motor assembly in accordance with claim 5 further comprising a first foot and a second foot extending from said first portion and said third portion, respectively, of said U-shaped member, said feet contacting said motor shell inner surface.

7. A motor assembly in accordance with claim 4 wherein said motor shell further comprises a third opening, said third opening adjacent said mounting bracket.

8. A motor assembly in accordance with claim 7 wherein said lock comprises a projection, said projection extending at least partially within said second opening.

9. A method for attaching a capacitor to a motor shell utilizing a mounting bracket including a lock and a tab, the lock separated from the tab along the mounting bracket by a distance, wherein the shell includes a tab coupling and an opening, said method comprising the steps of:

mounting the capacitor to the mounting bracket;

attaching the mounting bracket to the motor shell;

locking the mounting bracket onto the motor shell utilizing the lock such that the lock is adjacent the opening; and inserting the tab into the tab coupling.

10. A method in accordance with claim 9 wherein the mounting bracket includes a base, a first arm and a second arm, the first arm and the second arm extending from the base, said step of mounting the capacitor comprises the step of mounting the capacitor to the first arm and the second arm.

11. A method in accordance with claim 10 wherein the first aim and the second arm include a first member extending from the base and a curved member extending from the first member, said step of mounting the capacitor comprises the step of attaching the capacitor to the curved members of the first arm and the second arm.

12. A method in accordance with claim 9 wherein the mounting bracket includes a base, the base includes a first portion, a second portion, and a third portion, the motor shell includes a slot, said step of attaching the mounting bracket to the motor shell comprises the step of positioning the mounting bracket such that the first portion, the second portion, and the third portion are adjacent the motor shell.

13. A method in accordance with claim 12 wherein the mounting bracket further includes a second end, the tab extending from the second end and located between a first arm and a second arm, the tab coupling located between the slot and a motor shell second end, said step of attaching the capacitor bracket to the motor shell further comprises the step of attaching the second end of the mounting bracket adjacent the motor shell second end.

14. A method in accordance with claim 9 wherein the lock includes a circular projection, and the motor shell opening is a circular opening, said step of locking the mounting bracket onto the motor shell utilizing the lock further comprises the step of inserting the circular projection into the circular opening in the motor shell.

* * * * *